United States Patent
Yamatsu

[11] Patent Number: 5,907,534
[45] Date of Patent: *May 25, 1999

[54] OPTICAL RECORDING MEDIUM

[75] Inventor: Hisayuki Yamatsu, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,167

[22] Filed: Aug. 21, 1996

[30] Foreign Application Priority Data

Aug. 25, 1995 [JP] Japan .................................. 7-217746

[51] Int. Cl.$^6$ ...................................................... G11B 3/70
[52] U.S. Cl. ............................................................ 369/286
[58] Field of Search .................................. 369/283, 286, 369/275.1, 275.4, 275.5, 275.3; 428/694 ML, 694 SC, 694 MT, 694 RL, 694 MM

[56] References Cited

U.S. PATENT DOCUMENTS

| | | | |
|---|---|---|---|
| 5,186,994 | 2/1993 | Tatewaki et al. | 428/64 |
| 5,479,382 | 12/1995 | Nishida et al. | 369/13 |
| 5,521,006 | 5/1996 | Osato | 428/332 |
| 5,673,251 | 9/1997 | Suzuki et al. | 369/275.4 |

FOREIGN PATENT DOCUMENTS

A-0 534 693  3/1993  European Pat. Off. .

OTHER PUBLICATIONS

Patent Abstracts of Japan, P field, vol. 14, No. 474 (49 P 1117), Oct. 16, 1990, JP 02–189 743 A (Fujitsu, Ltd.)
Patent Abstracts of Japan, P field, vol. 13, No. 43 (151 P 821), Jan. 31, 1989 JP 63–239 630 A (Dai–Nippon Printing Co., Ltd.).
Patent Abstracts of Japan, P field, vol. 15, No. 446 (41 P 1274), Nov. 13, 1991 JP 03–185 641 A (Fujitsu, Ltd.).
Patent Abstracts of Japan, vol. 017, No. 596 (P–1636), Oct. 29, 1993 & JP–05 174438 (Kao Corp.), Jul. 13, 1993.

Primary Examiner—George J. Letscher
Attorney, Agent, or Firm—Hill & Simpson

[57] ABSTRACT

When information is recorded on and/or reproduced from an optical recording medium by irradiating rays of light on its information recording layer having a reflective film from the side where the reflective film is deposited, the noise can be reduced. The optical recording medium includes a substrate having a minute uneven portion formed on its surface, a reflective film formed by ion beam sputtering on the minute uneven portion of the substrate, and a transparent film as a light transmission layer deposited and formed on the reflective layer.

7 Claims, 5 Drawing Sheets

OPTICAL RECORDING MEDIUM

BACKGROUND OF THE INVENTION

1. Field of the Invention

The present invention relates to an optical recording medium.

2. Description of the Related Art

FIG. 1 is a cross-sectional view showing a compact disk which is a conventional optical recording medium, e.g., a read-only memory (ROM) type optical disk. The optical disk has a transparent substrate 1 formed of, for example, a polycarbonate (hereinafter referred to as PC) as a comparatively thick glass or plastic having a thickness of 1.2 mm. On one surface of the substrate 1, a minute uneven portion 2 such as a phase recording pit corresponding to, for example, data information, a tracking pregroove or the like is formed by injection molding, for example. A reflective film 3 made of metal such as Al, for example, is deposited on the minute uneven portion 2 by vacuum evaporation or sputtering. Thus, an information recording layer is formed. A protective film 4 generally formed of ultraviolet curing resin as a light curing resin having a thickness of, for example, 0.01 mm which is considerably thin as compared with the substrate 1 is deposited on the reflective film 3 of the information recording layer.

The optical disk having such arrangement has the substrate 1 which is a light transparent layer. Specifically, when information is optically read from the information recording layer of the optical disc, rays of light, i.e., rays of laser light L are irradiated from the side of the transparent substrate 1 having large thickness on the information recording layer to read the information by utilizing optical interference generated by the minute uneven portion 2 thereof.

The reason for reading the information by irradiating rays of light from the thick substrate 1 side as described above lies in the consideration that when there is dust, scratch or the like on the disk surface, the larger a distance between the information recording layer and a surface on which a reading light is incident to a certain extent, the smaller the influence of the dust, scratch or the like on the irradiated rays of light, i.e., the influence of noise of a signal becomes. However, since an amount of coma of a reading signal produced by inclination of the optical disk, i.e., so-called skew is in proportion to thickness of a light transmitting layer in this case, the above-described irradiation of rays of laser light from the side of the comparatively thick and transparent substrate 1 leads to a large amount of coma.

It is possible to exclude noises resulting from the dust, scratch or the like on the surface of the optical recording medium such as the above-mentioned optical disk or the like by a signal processing. Accordingly, as shown in FIG. 2, when the protective film 4 is formed as a transparent film and the rays of light, i.e., laser light are irradiated from the side of the thin protective film (transparent film) 4 to read out information from the minute uneven portion 2, it is possible to reduce the generation of coma. Reduction of the coma leads to a wider skew margin and also to higher recording density.

Even if in the optical recording medium such as the above-mentioned optical disk or the like the rays of light are irradiated from the side of the thin protective film 4 to read or record information from or on the optical disk with the noises resulting from the dust, scratch or the like being removed, then practical improvement with respect to the noise is not sufficient.

The inventor of this application found that one of main causes for producing the noises lay in the reflective film. Specifically, as shown in FIG. 3 which is a schematic diagram of the reflective film 3, the reflective film 3 is formed by vacuum evaporation, sputtering or the like on the minute uneven portion 2 formed by injection molding or the like as described above. The reflective film 3 has on a substrate 1 side a surface which, when the minute uneven portion 2 is seen from the substrate 1 side, is comparatively satisfactory in view of optics because of a condition of the molded surface of the substrate 1. On the other hand, the reflective film 3 has on the opposite side a surface which becomes an irregular surface because Al particles, for example, are irregularly accumulated thereon upon the process of vacuum evaporation, sputtering thereof or the like. Accordingly, when the information is read out from the information recording layer by irradiating rays of light on the above irregular surface, this irregular surface is not sufficiently flat for a wavelength (ranging from 630 nm to 800 nm) of the light irradiated thereon, e.g., a semiconductor laser light L. In particular, an Al evaporated film formed by vacuum evaporation has an Al particle size ranging from 50 nm to 100 nm, which largely influences the shape of the minute uneven portion 2 having a depth of about 100 nm. The Al evaporated film is formed of accumulated Al particles which are transferred thereto with a low energy in the order of $10^{-1}$, and hence has an unsatisfactory orientation of the Al particles and provides the scattering of a large amount of light on the film surface, which leads to generation of a considerable noise.

SUMMARY OF THE INVENTION

It is an object of the present invention to optically read recorded information from an optical recording medium and record information thereon satisfactorily, i.e., with a low noise by irradiating rays of light on a surface, where a protective film is deposited, of a reflective film, i.e., from the side of a thin transparent film formed on the reflective film.

An optical recording medium according to the present invention includes a substrate having a minute uneven portion formed thereon, a reflective film formed by ion beam sputtering on the minute uneven portion of the substrate, and a transparent film deposited on the reflective film. An information recording layer is formed of the minute uneven portion and the reflective film.

According to the present invention, since the optical recording medium has the reflective film formed by ion beam sputtering, the reflective film has a surface with an excellent property in view of optics, e.g., a satisfactorily dense state of particles. Therefore, when information is read out from or recorded on the above minute uneven portion by irradiating rays of light on the optical recording medium from the side of the reflection film surface, i.e., from the transparent film side, it is possible to effectively prevent the noise from being generated.

DESCRIPTION OF THE PREFERRED EMBODIMENTS

In this specification, definition of a word "transparent" is to have a high light transmittance with respect to a wavelength of light irradiated on an optical recording medium for the recording or reproduction of information.

An embodiment of the optical recording medium according to the present invention will hereinafter be described with reference to FIG. 4 which is a schematic, cross-sectional view thereof. In this embodiment, the present invention is applied mainly to a ROM type optical disk. It is needless to say that the present invention is not limited to its application to the above optical disk and its shape and can be applied to a magnetooptical disk, a phase change disk, and other various optical recording media having a card-like shape, a sheet-like shape or the like and an information recording layer with a minute uneven portion.

Figure 1:
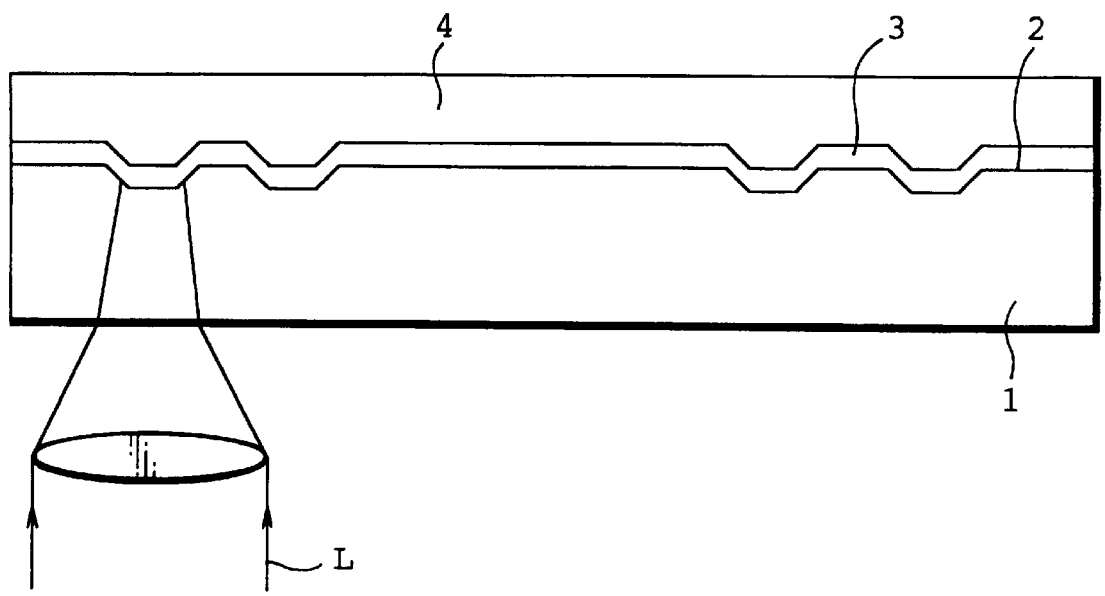
FIG. 1 is a schematic, cross-sectional view showing a optical recording medium.
Figure 2:
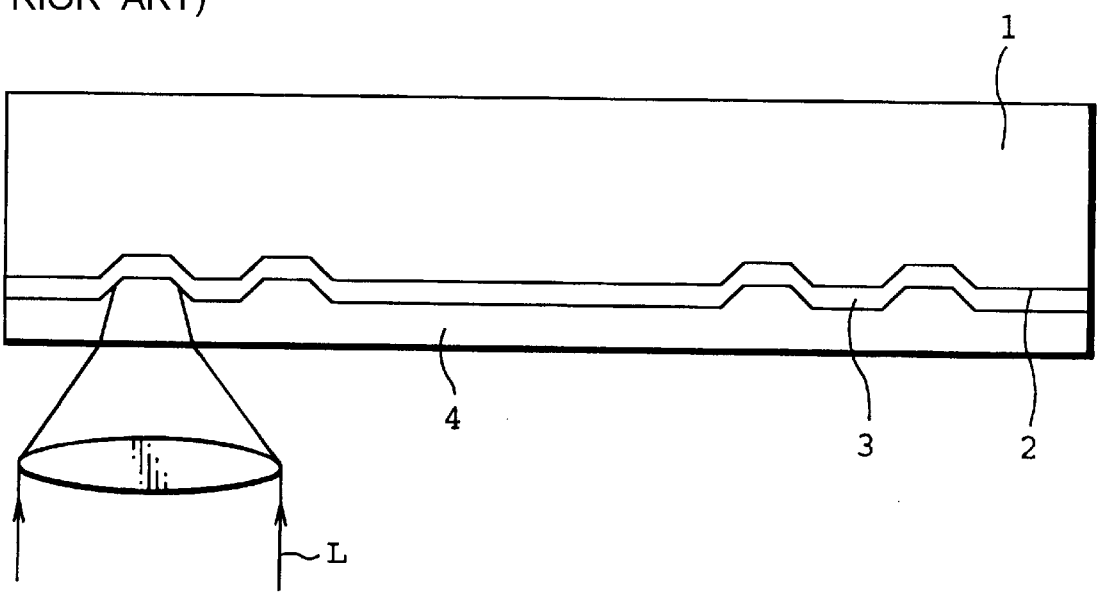
FIG. 2 is a schematic, cross-sectional view showing the optical recording medium, used to explain irradiation of rays of light thereon from a protective film side.
Figure 3:
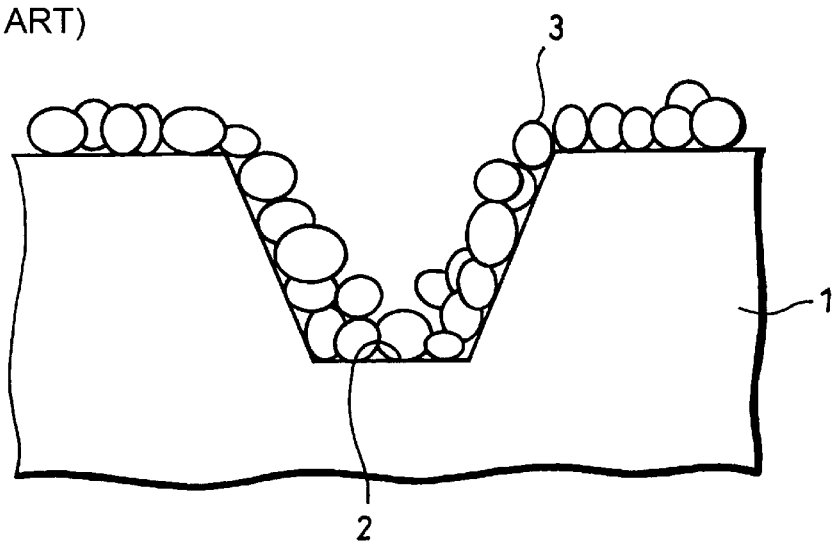
FIG. 3 is a schematic, cross-sectional view showing a reflective film of the optical recording medium.
Figure 4:
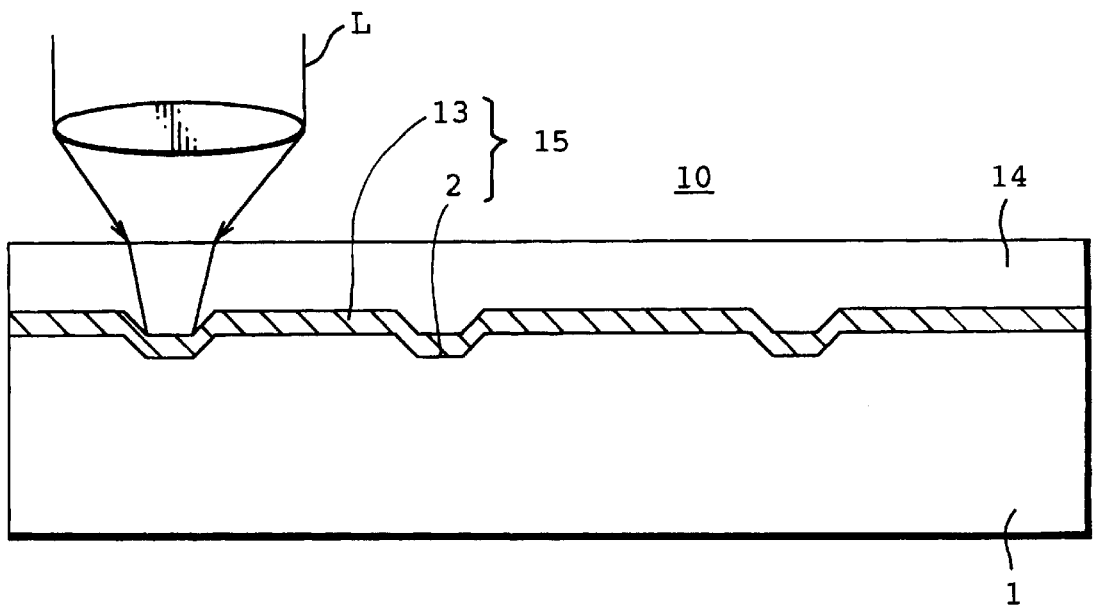
FIG. 4 is a schematic, cross-sectional view showing an embodiment of an optical recording medium according to the present invention.

FIG. 4 shows the whole of an optical recording medium 10 according to the present invention, e.g., an optical disk. In this case, a minute uneven portion 2 such as data information pits, a tracking groove or the like is formed on one main surface of a disk-like substrate 1 which may not be transparent. An Al reflective film 13 is formed particularly by ion beam sputtering on the minute uneven portion 2. Thus, an information recording layer 15 formed of the minute uneven portion 2 and the reflective film 13 is arranged. A thin transparent film 14 as a protective film having a thickness of 0.1 mm is deposited on the information recording layer 15.

The recorded information is read out from the minute uneven portion 2 of the information recording layer 15 by irradiating rays of light, i.e., rays of semiconductor laser light L on the transparent film 14 side of the optical recording medium, i.e., the optical disk 10.

Figure 5A:
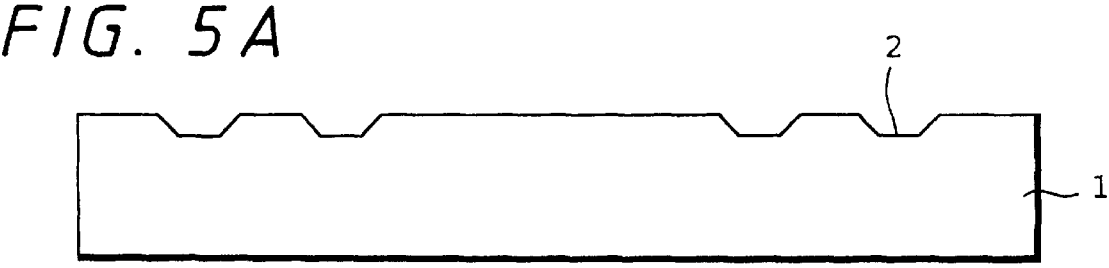
FIG. 5A, 5B and 5C are diagrams showing a process of manufacturing the optical recording medium according to the present invention.

A method of manufacturing the optical disk 10 will be described, by way of example, with reference to FIGS. 5A to 5C which are diagrams showing its process. In this case, as shown in FIG. 5A, initially, the substrate 1 having a thickness of 1.2 mm with the minute uneven portion 2 is formed on PC by injection molding, for example.

Figure 5B:
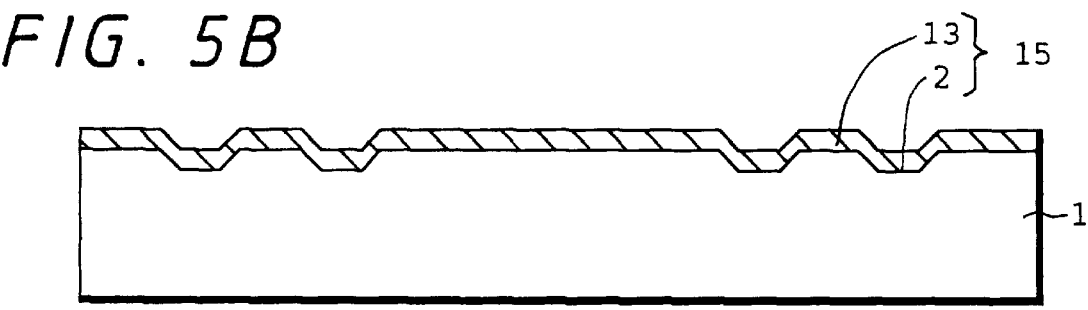

As shown in FIG. 5B, the reflective film 13 having a thickness of 60 nm, for example, is formed on the surface of the minute uneven portion 2 by ion beam sputtering employing Al as a target material.

Figure 5C:
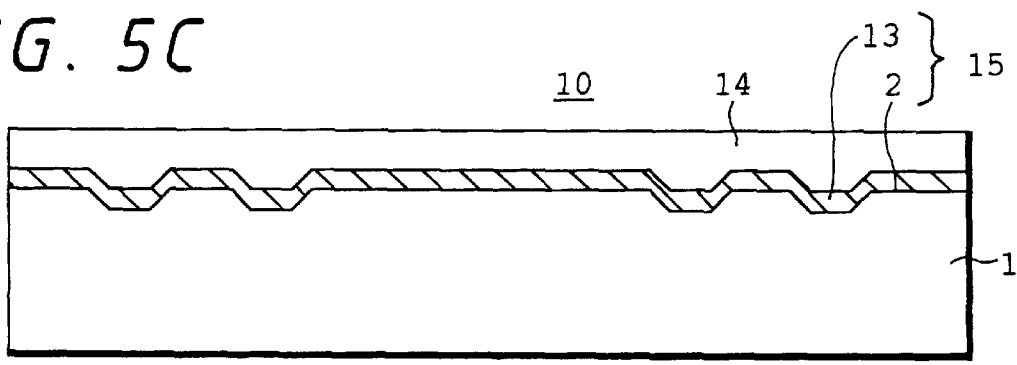

As shown in FIG. 5C, the transparent film 14 as the protective film for protecting the reflective film 13 is deposited on the reflective film 13. It is possible to form the transparent protective film 14 by coating, for example, light curing resin, e.g., ultraviolet curing resin (hereinafter referred to as UV curing resin) by spin coating or the like to cure the resin by exposure of the entire surface thereof, or to form the transparent protective film 14 by forming an optically transparent film of an amorphous carbon or the like by sputtering or chemical vapor deposition (CVD). Alternatively, it is possible to form the transparent protective film 14 by jointing a PC film, glass substrate or the like having a thickness of 0.1 mm.

Figure 6:
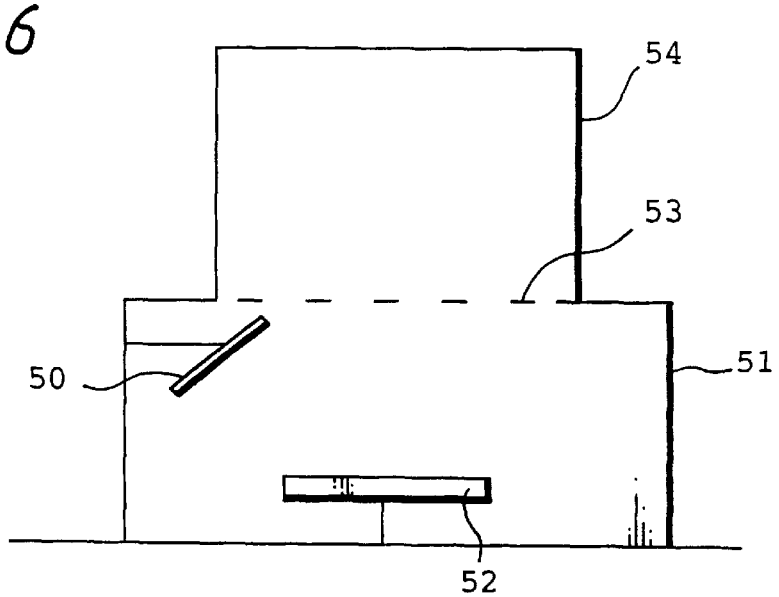
FIG. 6 is a diagram showing an arrangement of a reflective-film forming apparatus which is applied to fabrication of the optical recording medium according to the present invention.

The reflective film 13 is formed particularly by ion beam sputtering employing Al as the target material, for example, as described above. FIG. 6 is a schematic diagram of an example of an arrangement of an ion beam sputtering apparatus therefor. As shown in FIG. 6, the ion beam sputtering apparatus has a vacuum container 51 in which an Al target 52 is disposed and a substrate 50 is disposed so as to be opposed thereto. The ion beam sputtering apparatus 51 has a plasma generating chamber 54 which is separated by a mesh electrode 53 from the vacuum container 51 where the Al target 52 and the substrate 50 are disposed and in which Ar plasma is generated. Ar ions generated in the plasma generating chamber 54 are accelerated and impinged on the Al target 52, thereby the Al particles being ejected from, the Al target 52 and then accumulated on the substrate 50.

In this case, a degree of vacuum in the vacuum container 51 is set to $5 \times 10^{-5}$ or less and Ar gas is introduced into the plasma generating chamber 54 with its flowing amount of 8 cc/sec., and then ionized, thereby Ar ions being implanted. The Ar ions are accelerated by an electric field and impinged on the Al target 52 as an ion source with an energy substantially ranging from 300 to 20000 eV. The Al target 52 may be a target made of pure Al or an Al target mixed with a small amount of some elements such as Ti, Si or the like.

Figure 7:
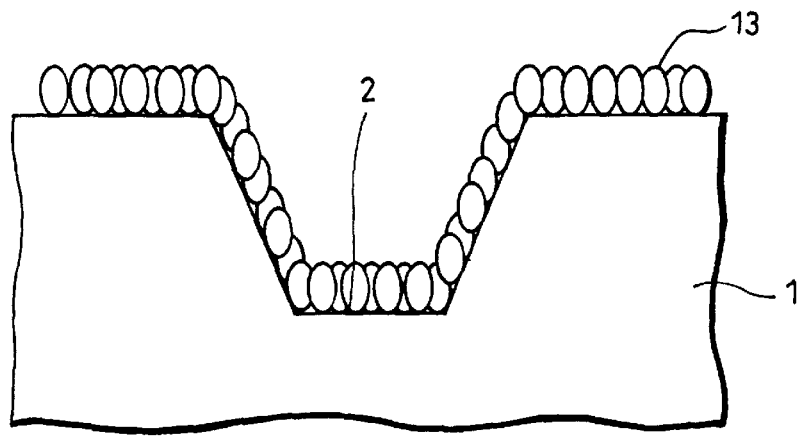
FIG. 7 is a schematic, cross-sectional view showing a reflective film of the optical recording medium according to the present invention.

As shown in FIG. 7 which schematically shows an accumulated state of Al particles in the reflective film 13, the reflective film 13 formed of the Al film by the above ion beam sputtering is formed with a lattice plane (111) whose orientation is in parallel to a surface, where Al is deposited, of the minute uneven portion 2. Accordingly, the reflective film 13 has a uniform film quality and a uniform film thickness on each of an upper surface, a bottom surface and side surfaces of the minute concave and convex portion 2. The reflective film 13 has a surface on the side of the protective film 14, the surface being flat and excellent in view of optics at each portion of the minute uneven portion 2.

As shown in FIG. 4, the information is read out from the information recording layer 15 by irradiating rays of laser light L on the optical recording medium 10, e.g., the optical disk 10 having such reflective film 13 formed on the minute uneven portion 2 and the transparent protective film 14 deposited on the reflective film 13, from the side of the transparent protective film 14 having a small thickness, i.e., from the side of the surface of the reflective film 13 on which the protective film 14 is deposited. Specifically, it is from the surface of the reflective film 13 that rays of light are irradiated on the information recording layer 15.

Since the optical disk 10, i.e., the optical recording medium 10 having the arrangement according to the present invention has a surface with the above-described optically excellent property although rays of light are irradiated on the information recording layer 15 from the protective film 14 side, a noise resulting from the reflective film 13 is effectively prevented.

Since a distance between the information recording layer 15 and a surface of the optical recording medium 10 on which rays of light, e.g., laser light are incident is set smaller, it is possible to improves the above-mentioned coma resulting from the skew, which leads to a higher recording density and a lower noise.

While in this embodiment the minute uneven portion 2 and the substrate 1 are formed by injection molding, the minute uneven portion 2 can be formed on the substrate 1 by photopolymerization.

The present invention can also be applied to a multilayer optical recording medium having a plurality of information recording layers laminated for a larger information recording capacity. In this case, it is desirable to employ a common optical head for the respective information recording layers which allows the respective information recording layers to be continuously recorded and/or reproduced, by simplifying a drive apparatus for the multilayer optical recording medium.

The present invention can be applied to the multilayer optical recording medium which allows rays of light to be irradiated on the respective information recording layers from the same side.

Figure 8:
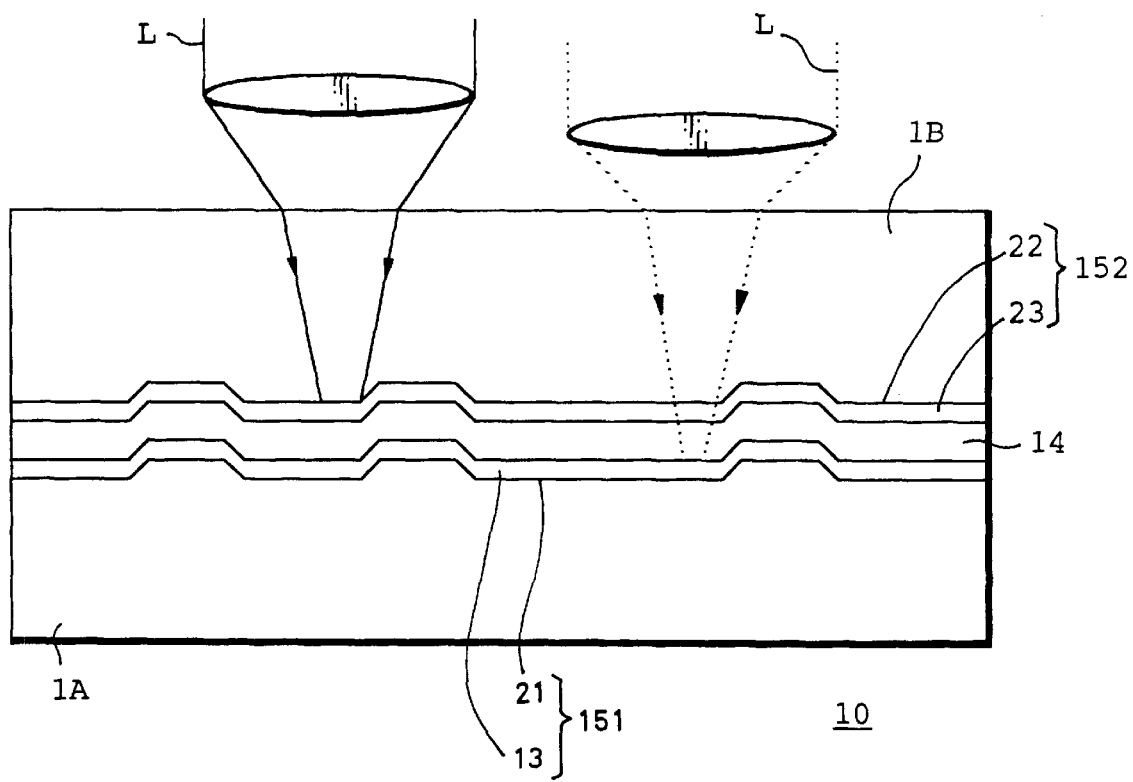
FIG. 8 is a schematic, cross-sectional view showing another embodiment of the optical recording medium according to the present invention.

FIG. 8 is a schematic, cross-sectional view showing a bilayer optical recording medium 10 to which the present invention is applied. In this case, the bilayer optical recording medium 10 has first and second information recording layers 151, 152 respectively having first and second minute uneven portions 21, 22 such as data information pits, tracking grooves or the like, the first and second information recording layers 151, 152 being laminated.

Figure 9:
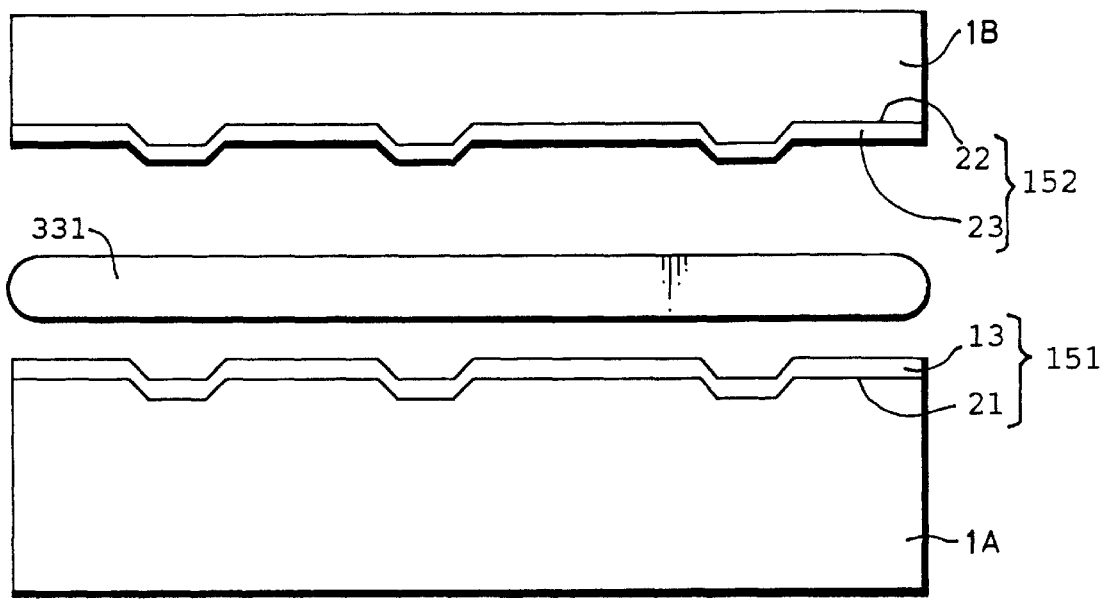
FIG. 9 is a diagram showing a process of manufacturing the optical recording medium shown in FIG. 8 according to the present invention.

A method of manufacturing the bilayer optical recording medium 10 will be described by way of example. In this case, as shown in FIG. 9, first and second substrate 1A, 1B respectively having the first and second minute uneven portions 21, 22 formed on their one main surfaces are manufactured by the injection molding or photopolymerization described above. In this case, at least the second substrate 1B is formed as a transparent substrate.

A reflective film 13 formed of an Al film, for example, having a thickness of 60 nm, for example, is formed by the above-mentioned ion beam sputtering on the main surface of the substrate 1A having the first minute uneven portion 21. Thus, the first information recording layer 151 is formed.

A semitransparent film 23 made of SiN having a thickness of 60 nm or Si having a thickness ranging from 10 to 15 nm is formed by ion beam sputtering or ordinary sputtering on the main surface of the second substrate 1B having the second minute uneven portion 22. Thus, the second information recording layer 152 is formed.

Figure 10:
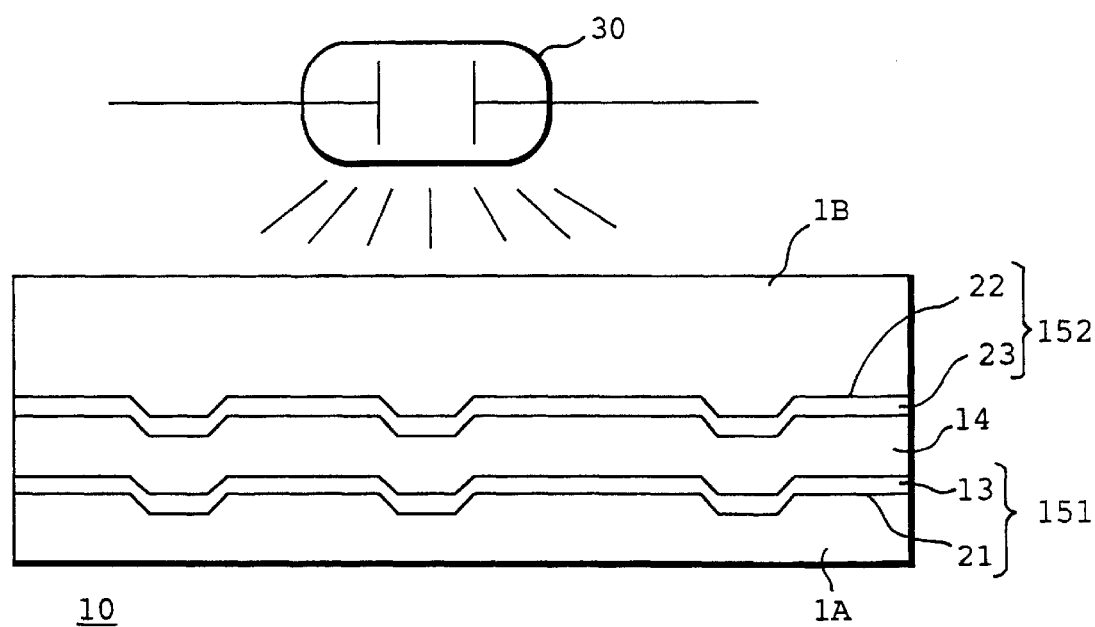
FIG. 10 is a diagram showing a process of manufacturing the optical recording medium shown in FIG. 8 according to the present invention.

These substrates 1A, 1B are opposed to each other so that their sides on which their respective information recording layer 151 and 152 are formed should be opposed to each other. The substrates 1A, 1B are pressed with a transparent light curing resin 331, e.g., UV curing resin 331 being disposed therebetween. As shown in FIG. 10, an ultraviolet ray lamp 30 for curing the light curing resin 331 irradiates ultraviolet rays on the light curing resin 331 disposed therebetween to cure the same. Thus, there is obtained the bilayer optical recording medium 10 shown in FIG. 8 in which the first and second information recording layers 151, 152 are laminated through a transparent film 14. This transparent film 14 is a transparent intermediate film which has in this embodiment a thickness of, for example, 40 μm of the range from 30 to 60 μm.

It is from the side of the second transparent substrate 1B that rays of information reading light, e.g., semiconductor laser L are irradiated on the information recording layers 151, 152 of the bilayer optical recording medium 10. When the information is read out from the second information recording layer 152, as shown by solid lines of FIG. 8, the rays of the laser light L are focused on the second information recording layer 152. When the information is read out from the first information recording layer 151, as shown by broken lines of FIG. 8, the rays of the laser light L are focused on the first information recording layer 151 from the side of the transparent film 14.

Although the rays of laser light L are irradiated on the first information recording layer 151 from the surface side of the reflection film 13 in this case, the reflective film 13 has a surface with the optically excellent property as described above, which can effectively prevent the noise resulting from the reflective film 13.

While in the above embodiments the optical recording medium is mainly the ROM type optical disk, the present invention is not limited to such optical disk. The present invention can be applied an optical recording medium having a reflective film formed therein, such as a magnetooptical recording medium, a phase change optical recording medium or the like. The present invention is not limited to the optical recording medium having the two information recording layers, and can be applied to the multilayer optical recording medium having three information recording layers or greater.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical recording medium comprising:

a substrate having a minute uneven portion formed on one of its surfaces;

a reflective film formed by ion beam sputtering on said minute uneven portion of said substrate, the reflective film having a uniform thickness on each of an upper surface, bottom surface, and side surface of said minute uneven portion; and a transparent protective film as a light transmission layer through which reading of said optical recording medium takes place which is deposited and formed on said reflective layer;

wherein, said reflective film is characterized by a particle density sufficient to enable readout or recording of information from or on said medium, respectively, without introduction of noise caused by physical imperfections, and wherein, said transparent film is of a thickness sufficiently small to minimize the effect of coma to a negligible level.

2. An optical recording medium according to claim 1, wherein said reflective film contains Al as its main component.

3. An optical recording medium according to claim 2, wherein said reflective film made of Al is formed so that orientation of an Al film should be in parallel to a surface ,on which it is deposited, of said minute uneven portion.

4. An optical recording medium according to claim 2, wherein said reflective film made of Al contains Ti and Si.

5. An optical recording medium comprising:

first and second substrates having minute uneven portions formed thereon;

a reflective film formed by ion beam sputtering on a minute uneven portion of one of said two substrates, the reflective film having a uniform thickness on each of an upper surface, bottom surface, and side surface of said minute uneven portion; and a transparent protective film as a light transmission layer through which reading of said optical recording medium takes place which is deposited and formed on said one substrate, the other substrate being laminated on said transparent film on a side opposite said one substrate;

wherein, said reflective film is characterized by a particle density sufficient to enable readout or recording of information from or on said medium, respectively, without introduction of noise caused by physical imperfections; and wherein, said transparent film is of a thickness sufficiently small to minimize the effect of coma to a negligible level.

6. An optical recording medium according to claim 5, wherein said reflective film contains Al as its main component.

7. An optical recording medium according to claim 6, wherein said reflective film made of Al is formed so that orientation of an Al film should be in parallel to a surface, on which it is deposited, of said minute uneven portion.

* * * * *